United States Patent [19]
Willis

[11] Patent Number: 5,816,012
[45] Date of Patent: Oct. 6, 1998

[54] DUAL THREADED FASTENER AND METAL COMPONENT ASSEMBLY

[75] Inventor: David R. Willis, Arlington, Tex.

[73] Assignee: Alpine Engineered Products, Inc., Pompano Beach, Fla.

[21] Appl. No.: 814,781

[22] Filed: Mar. 10, 1997

[51] Int. Cl.$^6$ .............................. E04C 3/02; F16B 25/00
[52] U.S. Cl. .............................. 52/696; 52/636; 411/387; 411/412
[58] Field of Search .......................... 411/411–414, 387; 52/696, 636, 729.2, 729.3

[56] References Cited

U.S. PATENT DOCUMENTS

| | | | |
|---|---|---|---|
| 3,478,639 | 11/1969 | Gruca | 411/387 |
| 3,524,378 | 8/1970 | Wieber | 411/412 |
| 3,682,507 | 8/1972 | Waud | 411/413 |
| 4,275,541 | 6/1981 | Orals | 411/412 |
| 4,621,963 | 11/1986 | Reinwall | 411/412 |
| 4,878,793 | 11/1989 | Hewison | 411/413 |
| 5,304,023 | 4/1994 | Toback et al. | |
| 5,433,570 | 7/1995 | Koppel | 411/413 |

OTHER PUBLICATIONS

Construction Publications, Inc., "Framing Systems Update," Jun. 1996, www.roofmag.com/jun/framing.html.

Alpine Engineering Products, Inc., Automated Builder, "New Light Guage Steel Truss Framing System Developed By Alpine," Apr. 1996, www.alpeng.com/alpine/steeltr.htm.

Primary Examiner—Flemming Saether
Attorney, Agent, or Firm—Crutsinger & Booth

[57] ABSTRACT

An improved fastener securing framing members to metal studs is provided. The fastener has rigid shank, an integral head, a self-tapping or drilling tip, and a first and a second spaced apart buttress threads. The shank has a generally circular cross-section and a longitudinally extending axis. The head integrally extends a first end of the shank and has a top portion and an underside. The self-drilling tip is extends from a second end of the shank. The first buttress thread is formed in said shank and is adjacent the head and partially traverses the shank, terminating from the shank's second end. The second buttress thread is formed in the shank and sufficiently spaced apart from the first buttress thread such that the first thread does not continue to threadingly feed the shank through an aperture formed by the self-drilling tip, the second buttress thread terminating adjacent the tip.

9 Claims, 3 Drawing Sheets

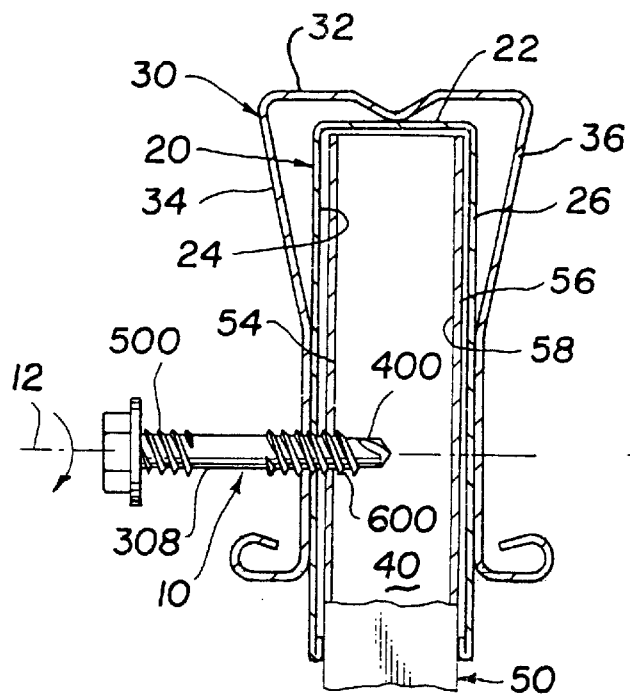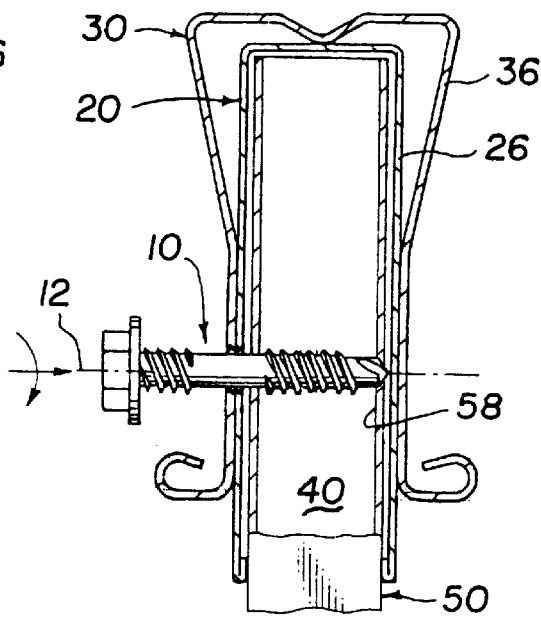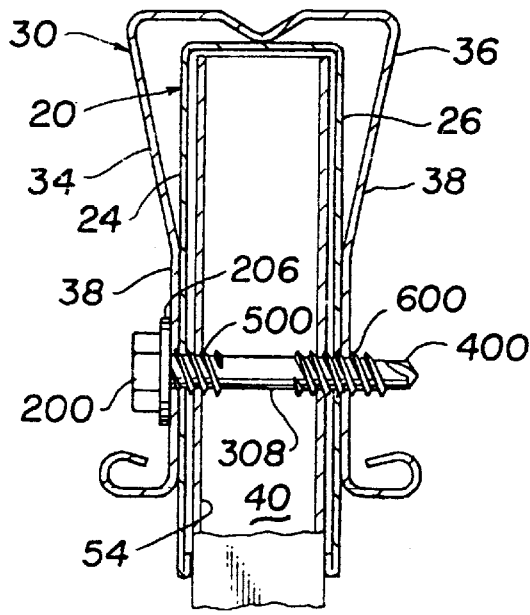
Fig. 5      Fig. 6
Fig. 7

DUAL THREADED FASTENER AND METAL COMPONENT ASSEMBLY

TECHNICAL FIELD

The present invention relates to improvements in fasteners employed to fasten together metal components in metal framing construction. More particularly, the present invention relates to fasteners employed for fastening metal members to interconnect framing members.

BACKGROUND OF THE INVENTION

Construction systems for metal buildings frequently employ steel studs or other framing components. These components have cross-sections that are generally U-shaped or tubular, but other varieties of members can have different cross-sectional shapes. For example, the TrusSteel System, available from Alpine Engineered Products, Inc., Grand Prairie, Tex., and Unimast, Inc., of Franklin Park, Ill., incorporate members having a generally trapezoidal cross-section.

Conventional fasteners tend to force apart the legs of framing components when installed. That is, once the fastener extends through the first leg of a framing component and the fastener tip engages the second leg, the threaded portions of conventional fasteners continue to feed the fastener's shank at a rate faster than what the self-tapping tip can accommodate. Because the self-drilling tip has not "bitten" into or begun forming an aperture through the second leg, a longitudinal force, created by the continuous feeding, urges the second leg to deflect with respect to the first leg. As a result, a general flare between the legs is formed. Although the tip eventually feeds through the second leg, the deformation cannot readily be corrected. Thus, a nonconforming fit is created between a framing member and the connector or other framing member component inserted into a U-shaped component channel. Similar deformation occurs in tubular components. Thus, it is desirable to have a fastener that does not deform the framing components when secured to other metal, or even wooden, framing components.

SUMMARY OF THE INVENTION

In accordance with the invention, provided is an improved fastener securing framing components together. The fastener has a rigid shank, an integral head, a self-tapping or drilling tip, and a first and a second spaced-apart buttress threads. The shank has a generally circular cross-section and a longitudinally extending axis. The head integrally extends from a first end of the shank and has a top portion and an underside. The self-drilling tip extends from a second end of the shank. The first buttress thread is formed in the shank and is adjacent to the head and partially traverses the shank. The first buttress thread terminates distal from the shank's second end. The second buttress thread is formed in the shank and is sufficiently spaced apart from the first buttress thread such that the first thread does not continue to threadingly feed the shank through an aperture formed by the self-drilling tip. The second buttress thread terminates adjacent about the transition of the shank and the tip.

BRIEF DESCRIPTION OF THE DRAWING

The accompanying drawings are incorporated into and form a part of the specification to illustrate examples of the present invention. These drawings together with the written description serve to explain the principles of the invention. The drawings are only for purposes of illustrating preferred or alternate examples of how the invention can be made and used and are not to be construed as limiting the invention to only the illustrated and described examples. The various advantages and features of the present invention will be apparent from a consideration of the drawings in which:

FIG. 5 is a side elevational view of the fastener having partially engaged a first leg of a frame member, sandwiched with a first leg of a connector member and a tubular member, portions of which are illustrated in section;

FIG. 6 is a side elevational view of the fastener with its non-threaded shank portion extending through an aperture in the first legs of the frame member, the connector member and the tubular member and the self-threading tip in a position to engage the second legs of the frame member, the connector member and the tubular member, portions of which are illustrated in section;

FIG. 7 is a side elevational view of the fastener in an installed configuration fastening the steel member, the connector member and the tubular member.

DETAILED DESCRIPTION OF A PREFERRED EMBODIMENT

Figure 1:
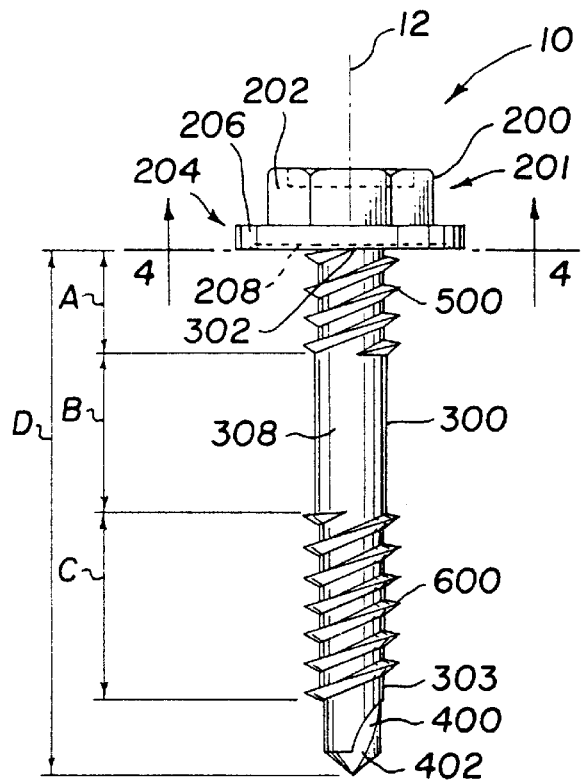
FIG. 1 is a side elevational view of a fastener in accordance with the present invention.

Examples for practicing the present invention will be described by referring to the drawing. In the drawing, like reference numerals and characters are used throughout the several figures to indicate like or corresponding parts. Referring to FIG. 1, a metal fastener in accordance with the invention is generally designated by the numeral 10. Fastener 10 has a head 200. Head 200 has a top portion 201 defining hex profile 202 that can receive a complementary driver of a pneumatic or electric torque gun, or hand-driven ratchet wrench to impart a torsional force to fastener 10. It should be noted that other types of mechanical connections can be had so that a torsional force can be applied to longitudinally-extending axis 12 of fastener 10. For example, head 200 can have a square socket formed therein for receiving a complementary driver, similarly driven by a pneumatic or electric torque gun or hand-driven socket wrench. Head 200 has underside portion 204 with an integral circumferential flange or washer 206. Underside portion 204 also defines an annular recess 208.

Fastener shank 300 integrally extends at its proximal end 302 from underside portion 204 of head 200. Annular recess 208 surrounds proximal end 302 of shank 300. Shank 300 terminates at a second end 303 at a self-drilling tip 400.

Shank 300 is partially traversed by a first buttress thread 500. A second buttress thread 600 is spaced apart from first buttress thread 500. First buttress thread 500 extends a length A from approximately the proximal end 302 and terminates in a generally-tapered fashion with the shank's outer surface. First-thread length A is about thirty-three percent of the length of shank 300. Length A is sufficient to engage at least three layered-thicknesses of framing members, which can comprise a connector member, a chord member, and a tubular member, such as those shown in FIGS. 5 through 7, where the layered thickness is shown by component portions 24, 34, and 54, accordingly. It is desirable that the first buttress thread come as close to proximal end 302 as plausible to encourage a relational locking force of washer 206 with an outer surface of a frame member when fastener 10 threadingly engages the member, while at least one full buttress thread rotation extends past the inner surface 54 (see FIG. 7). Preferably, first buttress thread 500 comes within about 0.04 inches (about 1.0 millimeters) of proximal end 302.

Fastener 10 is made of a rigid durable material having physical characteristics sufficient to withstand stress loads caused by torsional forces exerted against fastener 10 and resultant frictional heating. Such a material is machine-grade steel.

Figure 2:
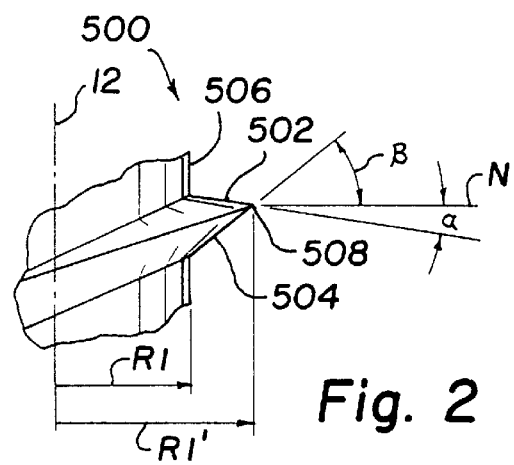
FIG. 2 is an enlarged fragmentary view, partly in schematic, of a portion of the first buttress thread of the fastener of FIG. 1.

Referring to FIG. 2, shown is first buttress thread 500 with support surface 502 and driving surface 504. In a preferred form, support surface 502 is oriented at an angle α of approximately ten degrees to a line N. Line N is normal to longitudinally-extending axis 12. Minor radius R1 of first buttress thread 500 is measured from axis 12 to circumferential outer edge 506. Major radius R1' of first buttress thread is measured from axis 12 to thread edge 508.

It should be noted that fastener 10 can be embodied in a variety of sizes without varying from the spirit of the invention. For example, with a fastener having size-12 screw dimensions, angle β between normal line N and driving surface 504 is about 35 degrees, minor radius R1 is about 0.078 inches (about 2.0 millimeters) and a major radius R1' of about 0.12 inches (about 3.0 millimeters). As a second example, a fastener having size-14 screw dimensions, has a minor radius R1 of about 0.088 inches (about 2.2 millimeters) and a major radius R1' of about 0.135 inches (about 3.4 millimeters).

Figure 3:
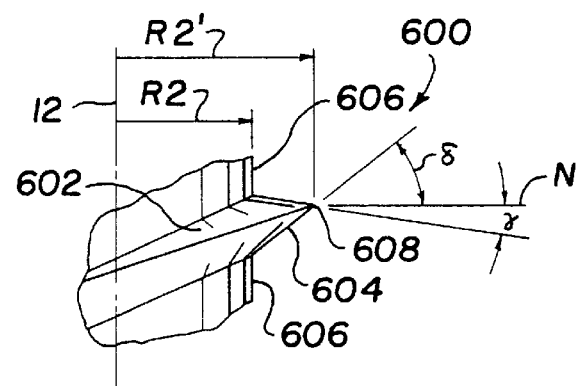
FIG. 3 is an enlarged fragmentary view, partly in schematic, of a portion of the second buttress thread of the fastener of FIG. 1.

Referring to FIG. 3, shown is second buttress thread 600 with support surface 602 and driving surface 604. Referring back briefly to FIG. 1, second buttress thread 600 is spaced apart from first buttress thread 500 a length B, defining a non-threaded shank portion 308. Length B is dimensioned to such that first buttress thread 500 does not continue to threadingly feed shank 300 through an aperture—formed by buttress thread 600 and tip 400—when tip 400 engages inner surface 58 of frame component 50 (shown in FIG. 6).

Referring back to FIG. 3, in a preferred form, support surface 602 is oriented at an angle γ of approximately 10 degrees to line N, which is normal to the longitudinally-extending axis 12. Also, angle δ, between normal line N and driving surface 504, is about 35 degrees. Minor radius R2 of second buttress thread 600 is measured from axis 12 to circumferential outer edge 606 of buttress thread 600. Major radius R2' of first buttress thread is measured from axis 12 to thread edge 608. Radii R2 and R2' are substantially similar to radii R1 and R1', respectively. Thus, similar physical dimensions discussed above with respect to first buttress thread 500 also apply to second buttress thread 600 with respect to size-12 and size-14 screw parameters, as discussed above. A manufacturer's tolerance or root value on buttress threads 500 and 600, with respect to the diameter values, is about ±0.01 inches (about 0.3 millimeters).

Referring back to FIG. 1, second buttress thread 600 fades adjacent tip clean-out flutes 402. Second buttress thread 600 and has a second-thread length C, which is about forty-percent of the length of shank 300. Second buttress length C is dimensioned to securingly engage at least three thicknesses of material such as that illustrated in FIGS. 5 through 7. To threadingly lock or secure the members together, second-thread length C is sufficient to have at least one full buttress thread rotation to protrude past the interior surface 58 of the tubular member 50 and at least another full buttress thread rotation to protrude past the exterior surface 38 of the outermost frame member 30. Similarly, first-thread length A is dimensioned to urgingly engage head portion 200 with outer surface 38 of frame member 30 while at least one full buttress thread rotation protrudes past the inner surface 54 of the tubular member 50.

Clean-out flutes 402 terminate the distal portion or the second end of shank 300. Flutes 402 are combines with a drill tip for tapping apertures into leg portions of frame components. Flutes 402 are oriented at an angle of approximately 26 degrees with respect to axis 12 of fastener 10. Drill tip 400 extends from a second end of said shank 300 about twenty percent of shank 300. The thread configurations of first and second buttress threads 500 and 600, respectively, are also generally structured for self-tapping or feeding into the frame member.

With respect to lengths A, B and C as discussed above, an example of the dimensions of a metal fastener is provided. With a shank and tip having a length D of about 1.25 inches (about 3.18 cm), first-thread length A is about 0.30 inches (about 7.6 millimeters), length B is about 0.30 inches (about 7.6 millimeters), and second-thread length C is about 0.40 inches about 10.2 millimeters). Tip 400 extends about 0.25 inches (about 6.4 millimeters) from the second end of shank 300. With respect to this example, a suitable diameter of shank 300 is about 0.16 inches (about 4.1 millimeters). A suitable head 200 has a diameter of about 0.34 inches (about 8.6 millimeters) and washer 206 has a diameter of about 0.49 inches (about 1.24 centimeters).

Figure 4:
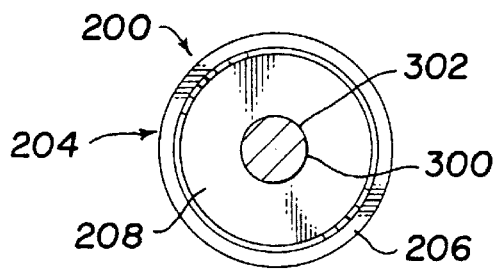
FIG. 4 is a sectional view of the fastener of FIG. 1 taken along the line 4—4 thereof.

Referring to FIG. 4, the underside of head 200 is illustrated. With the dimensions already indicated in the example above for head 200 and washer portion 206, annular recess 208 has a depth of about 0.02 inches (about 0.5 millimeters) and a diameter from about 0.40 inches (about 1.02 centimeters) to about 0.42 inches (about 1.07 centimeters).

Referring to FIGS. 5 through 7, shown is an installation of fastener 10 to secure together framing component member 30, connector 20 and tubular member 50. It should be appreciated that the upper portions of the support surfaces 502 and 602 of buttress threads 500 and 600, respectively, provide a ledge for locking together frame member 30, connector member 20, and tubular member 50. In this example, components 20 and 30 define a general U-shaped channel 40, and each have a base portion 22 and 32, respectively, and a pair of legs 24 and 26, 34 and 36, respectively, extending therefrom. U-shaped channel 40 is sized to receive vertically-oriented tubular member 50 therein. The components are nested together to form an overlapping portion or region to secure the components together with the fastener 10. It should be noted that other combinations of framing components can be secured together with fastener 10. Also, the framing components can be replaced with other forms of construction materials. For example, member 50 can be replaced with a conventional 2-by-4 wooden framing member.

Referring to FIG. 5, second buttress thread 600 is threaded through leg portions 24 and 34, respectively, and wall portion 54 of tubular member 50. An aperture is formed with the self-tapping tip 400 by urging the tip against the overlapping portion of the components 20, 30 and 50, respectively. Referring to FIG. 6, as a torsional or rotational force is applied along axis 12 of fastener 10, second buttress thread threadingly engages and threadingly taps an aperture through the first legs 24 and 34 of each component 20 and 30, respectively, and wall portion 54. When second buttress thread 600 passes through the aperture and extends into channel 40, the non-threaded shank portion 308, having a longitudinal dimension B, now extends through the aperture formed through leg portions 24 and 34 and wall portion 54 with tip 400. Applying a longitudinal force along axis 12 of fastener 10, tip 400 engages inner surface 58 of wall portion 56. Unlike conventional fasteners, the non-threaded portion 308 does not continue to threadingly feed fastener 10 through the aperture formed in leg portions 24 and 34 and wall portion 54. Rotating fastener 10 about the axis 12 while urging the tip 400 against the overlapping portion formed in component legs 26 and 36, respectively, tip 400 taps into inner surface 58 of wall portion 56 of tubular member 50. When sufficiently tapped, first buttress thread 500 threadingly engages the wall portion 54 and second legs 24 and 34, accordingly. First buttress thread 500 continues to do so until the head 200 of the fastener 10 substantially resists further rotation of fastener 10 by engaging outer surface 38 of connector component 30.

Figure 8:
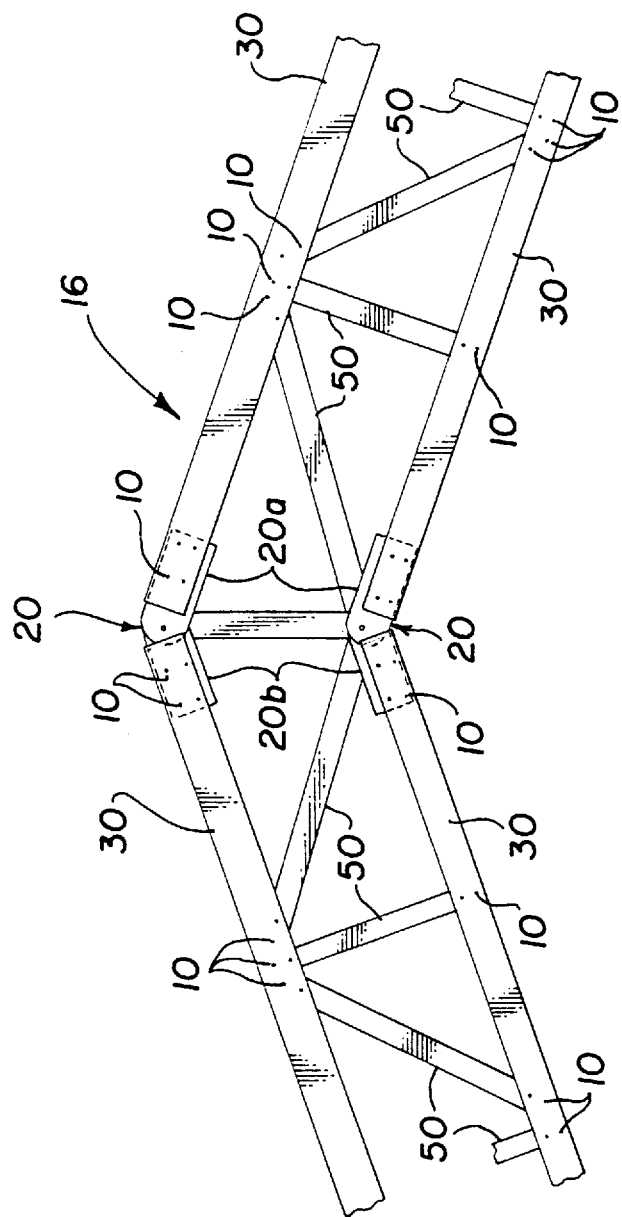
FIG. 8 is a perspective view of a truss having a plurality of members assembled using a plurality of fasteners of the present invention.

FIG. 8 illustrates an example of using fasteners 10 in building construction. Shown is a truss 16 having frame or chord members 30, connector members 20 and tubular members 50. Chord members 30 have similar cross-sections with the chord member 30 illustrated in FIGS. 5 through 7. Chord members 30 receive pitch brake connector legs 20*a* and 20*b*, accordingly. Tubular members 50 are received in chord members 30 and pitch break connectors 20 at predetermined locations to create a truss having predefined load characteristics. Such design techniques are currently used and are not discussed in further detail herein. With members 20, 30 and 50 in position, fasteners 10 are threadingly fastened to the components to create truss 16, which is then used in building construction or the like.

The embodiment shown and described above are only exemplary. Many details are often found in the art such as other forms of metal framing fasteners. Therefore, many such details are neither shown or described. It is not claimed that all the details, parts, elements, and steps described and shown or invented herein are invented herein. Even though numerous characteristics and advantages of the present invention have been set forth in relationship to a fastener for metal studs the foregoing description has application to other types of stud construction and changes may be made in the detail especially in matters of shape, size, and arrangement of parts wherein the principles of the invention to the full extent indicated by the broad general meaning of the terms used in the attached claims. The restrictive description and drawings of this specific examples above do not point out what an infringement of this patent would be, but are to provide at least one explanation of how to make and use the invention. The limits of the invention or the bounds of the patent protection as measured by and defined in the appended claims.

What is claimed is:

1. A fastener and metal framing component combination comprising:
    at least two metal framing components nested together to form first and second overlapping sections; and
    a screw fastener for securing said framing components together, said fastener comprising a rigid shank with a generally circular cross-section, a self-drilling tip extending from said shank, a head extending from the opposite end of said shank, a first threaded portion formed in said shank adjacent said head, a second threaded portion formed in said shank adjacent said tip, said threaded portions of similar diameter, said threaded portions axially spaced from one another by an unthreaded portion of said shank, said threaded portions so spaced that said first threaded portion is threadingly engaged with an aperture in said first overlapping section only where said second threaded portion is engaged with an aperture in said second overlapping section.

2. The combination of claim 1 wherein said head defines a hex socket for receiving a complimentary driver.

3. The combination of claim 1 wherein said head further comprises:
    an integral circumferential flange adjacent said underside and radially extending past a circumferential surface of said head.

4. The combination of claim 1 wherein said underside of said head defines an annular recess.

5. The combination of claim 1 wherein said second threaded portion fades into said tip at an intersection of said threaded portions and said tip.

6. The combination of claim 1 wherein said first threaded portion extends along about thirty-three percent of said shank, said second threaded portion extends along about forty percent of said shank.

7. The combination of claim 1 wherein said first threaded portion extends along said shank a distance sufficient for threadingly engaging at least the thickness of said first overlapping section.

8. The combination of claim 1 wherein said second threaded portion extends along said shank a distance sufficient for threadingly engaging at least the thickness of said second overlapping section.

9. A combination as in claim 1, wherein:
    said framing components comprise at least two generally U-shaped components each having a base and a first and second leg extending therefrom, and at least one tubular component having a tube wall with a first and second wall section;
    said first overlapping section comprises coextensive sections of said first legs of said U-shaped components and said first wall section of said tubular component;
    said second overlapping section comprises coextensive sections of said second legs of said U-shaped components and said second wall section of said tubular component.

* * * * *